Oct. 5, 1965

M. J. FRASER 3,210,610

APPARATUS FOR ELECTRICALLY INSULATING THE TURNS OF SUPERCONDUCTING COILS

Filed Sept. 23, 1963

WITNESSES:

INVENTOR
Malcolm J. Fraser
BY

ATTORNEY

United States Patent Office 3,210,610
Patented Oct. 5, 1965

3,210,610
APPARATUS FOR ELECTRICALLY INSULATING THE TURNS OF SUPERCONDUCTING COILS

Malcolm J. Fraser, Penn Hills, Pa., assignor to Westinghouse Electric Corporation, Pittsburgh, Pa., a corporation of Pennsylvania Filed Sept. 23, 1963, Ser. No. 310,777
7 Claims. (Cl. 317—123)

This invention relates in general to superconducting apparatus and more particularly to a means for electrically insulating adjacent turns of composite conductor superconductors.

Superconducting solenoids are being constructed for use as electromagnets and for other purposes where a high strength magnetic field is required. Composite conductors having a central core of a material capable of being made superconducting and an outer sheathing material chemically compatible with the core material are desirable for use in such solenoids. Because of the nature of some of the better superconducting materials used for the core, the core of the composite conductor tends to be brittle. One example of such a composite conductor is a wire with a core of $Nb_3Sn$ sheathed with Nb. Another example is a wire with a core of $Nb_3Sn$ and a sheathing of a Nb-Zr alloy. The sheathing provides mechanical support for the brittle core during fabrication of the conductor and the superconducting apparatus. The Nb sheathing is compatible chemically with a $Nb_3Sn$ core and thus prevents contamination of the core. A sheathing material which is chemically compatible with a superconducting core is usually a superconductor itself. Hence, means must be found to render the sheathing non-superconducting or resistive in order to electrically insulate the core.

By superconducting I mean that electrical property of materials at very low temperature which enables these materials to exhibit substantially no D.C. electrical resistance or a D.C. electrical resistance so low as to be incapable of measurement. A magnetic field may be used to render the superconductor normal or resistive.

After the composite conductor is drawn into a fine wire, the elements of the core may be reacted at elevated temperature to form a compound capable of being made superconducting. Alternatively, the composite conductor may be fabricated into the device, viz a solenoid and the core reacted in situ. It is difficult to form a wire of such a superconducting core compound into a coil or solenoid without coating the core with a sheathing for mechanical protection. Conventional electrical insulators such as inorganic compounds containing oxides or phosphates or normally conducting metals have the disadvantage of increasing the bulk of the conductor. Bulky insulation means that a coil will have a low space factor.

Accordingly, the general object of this invention is to provide a new and improved superconducting apparatus.

It is a more particular object of this invention to provide a new and improved means for electrically insulating the turns of a superconducting solenoid.

It is yet another object of this invention to provide a superconducting solenoid fabricated with composite compound wire having a high space factor.

A further object of my invention is to provide an improved electromagnet.

Other objects of this invention will, in part be obvious and will, in part appear hereinafter.

Briefly, the present invention accomplishes the above cited objects by providing an auxiliary magnetic field to be used in conjunction with a composite conductor superconducting solenoid. The composite conductor or wire comprises a central core of one material capable of being made superconducting and a sheath of a second material capable of being made superconducting. The material chosen for the sheath is one with a substantially lower critical magnetic field than the critical magnetic field of the material used for the central core. By critical magnetic field I mean the magnetic flux density which will render an electrically superconducting material normal, non-superconducting, and resistive. For example, I have found that an Nb sheath has a critical magnetic field of approximately 2 to 3 kilogauss. I have found that an $Nb_3Sn$ central core has a critical magnetic field of approximately 180 kilogauss. The critical magnetic field is also sometimes referred to as the magnetic quenching level.

The auxiliary magnetic field is energized before attempting to start an electric current circulating in the composite wire superconducting solenoid. The auxiliary magnetic field renders the sheathing material of the composite conductor normal or non-superconducting. An electric current can now be initiated in the core of the composite conductor of the superconducting solenoid because the sheathing of the composite conductor is effectively an electrical insulator compared to the substantially zero resistance core of the composite conductor. The auxiliary magnetic field is closely coupled magnetically to the superconducting solenoid. The electrical connections to the superconducting solenoid are so arranged that an electrical current in the superconducting solenoid will produce a magnetic field that is additive to the magnetic field produced by the auxiliary magnetic field. The auxiliary magnetic field is not made strong enough to render the core of the composite conductor normal or resistive.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which.

Figure 1A:
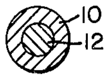
FIGURE 1A shows a transverse sectional view of a two layer composite conductor.

Referring to the drawings and in particular to FIG. 1A one may see how a composite conductor is constructed. A protective tube or sheath 10 is filled with a chemically compatible central conductor or core 12 having the desired superconducting properties.

Figure 1B:
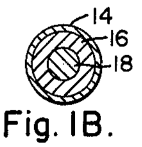
FIG. 1B shows a vertical transverse sectional view of a three layer composite wire.

In FIG. 1B there is illustrated a cross-section of a three layer composite conductor which has an outer coating 14 of a metal such as Monel which is incapable of becoming superconducting, a protective tube or sheath 16 which is chemically compatible with a superconducting core 18. The outer coating or sheath 16 serves to electrically insulate adjacent turns in a coil made from such a composite conductor but has the disadvantage of decreasing the space factor of the coil. The space factor of a coil is to be understood to mean the ratio of the volume of the coil occupied by superconducting material to the total volume of the coil.

Figure 2:
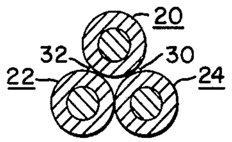
FIG. 2 is a transverse sectional view of a portion of a solenoid having a plurality of turns of the conductor illustrated in FIG. 1A.

One may observe in FIG. 2 that when several turns 20, 22 and 24 of a composite conductor are in contact they will be electrically short circuited at points 30 and 32 unless the sheath of the composite conductor can be made electrically less conductive than the core of the composite conductor.

Figure 3:
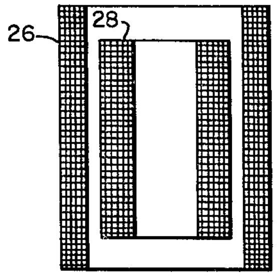
FIG. 3 is a vertical transverse sectional view of a solenoid of composite conductors surrounded by an auxiliary magnetic field device.

There is illustrated in FIG. 3 one embodiment of my invention for insulating the turns of a composite wire superconducting solenoid from one another. I place a composite wire superconducting solenoid 28, as described above, inside of a second solenoid 26 which may be either a superconducting solenoid or a conventional electromagnet. I call the second solenoid 26 a starting coil. I energize the second solenoid or starting coil 26 with an electric current to produce a magnetic field throughout the composite conductor superconducting solenoid 28. The magnetic field produced by solenoid 26 is designed to be strong enough to exceed the critical magnetic field of the sheathing of the composite wire of solenoid 28. The sheathing thus becomes normal or resistive. The auxiliary magnetic field is not made strong enough to exceed the critical magnetic field of the core material of the composite conductor used in the superconducting solenoid 28. An electric current may be now initiated in the now effectively insulated turns of superconducting solenoid 28.

Figure 4:
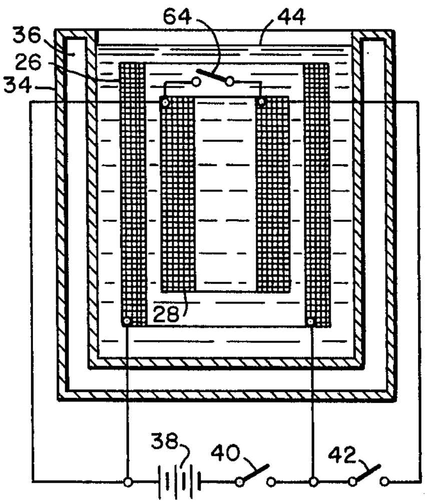
FIG. 4 is a vertical transverse sectional view of the solenoid and auxiliary magnetic field device of FIG. 3 in a cryogenic enclosure.

In FIG. 4 is illustrated an embodiment of my invention in which I enlose the two concentric solenoids of FIG. 3 in a Dewar flask 34 having a vacuum chamber 36. I cool the inside of this Dewar with a liquified gas 44 such as helium. The inner or main field superconducting solenoid 28 is wound with a composite conductor as previously described. The outer solenoid or starting coil 26 may be wound with any material which will become superconducting such as hard-drawn pure Nb. I connect both of the superconducting solenoids 26 and 28 to a source of direct current such as battery 38 by means of switches 64, 40 and 42. The connections between the battery 38 and the superconducting solenoids 26 and 28 are made so that the magnetic fields produced by the solenoids will be additive.

In operation, I close the circuit between the outer solenoid or starting coil 26 and the battery 38 by closing switch 40. An electric current now circulates through starting coil 26 providing a magnetic field inside starting coil 26 which is calculated to quench or render non-superconducting the sheathing used in the composite core conductor of the inner or main field solenoid 28. The starting coil 26 is designed to produce a magnetic field which is insufficient in strength to quench or render normal the central core used in the composite conductor of the inner or main field solenoid 28. The individual turns of the inner or main field superconducting solenoid 28 are now effectively electrically insulated from one another and switch 42 may now be closed to initiate an electric current in the main field composite conductor superconducting solenoid 28. Once an electric current is started in the solenoid 28 the direct current source 38 may be removed and the solenoid 28 short circuited at its input terminals by closing switch 64 and opening switch 42. A circulating current will continue through the solenoid 28 as long as the solenoid 28 is maintained in a superconducting state.

Figure 5:
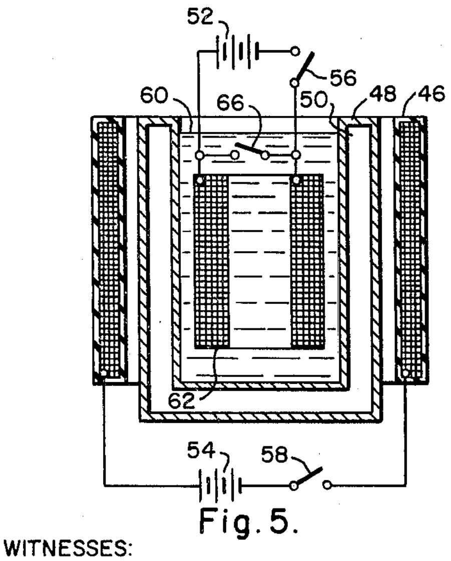
FIG. 5 is a transverse sectional view illustrating an alternative embodiment of the invention in which an auxiliary solenoid is not supercooled.

An alternative embodiment of my invention which employs a conventional electromagnet 46 for a starting coil is illustrated in FIG. 5. In this embodiment of my invention I place only the composite wire or main field solenoid 62 in a cryogenic environment. A cryostat or Dewar flask 48 having a vacuum or insulating space 50 is placed around the composite wire solenoid 62. The cryostat is then cooled with a liquifield gas such as helium 60. When the solenoid 62 is cooled to the temperature at which it exhibits the superconducting phenomenon, a starting coil 46 which may be a conventional electromagnet, is placed around both the composite wire solenoid 62 and the associated cryostat 48. The starting coil 46 is then connected to a source of direct current 54 by means of switch 58. The direct current that then circulates through the starting coil 46 is designed to produce a magnetic field of sufficient strength to render the sheathing of the composite conductor turns of superconducting solenoid 62 normal or non-superconducting. The composite wire superconducting solenoid 62 may then itself be energized from a source of direct current such as battery 52 by closing switch 56. The individual turns of the composite wire superconducting solenoid 62 are prevented from becoming electrically short crcuited by the normal or non-superconducting sheathing of the composite wire.

Once a circulating current has been initiated in the superconducting solenoid 62, the direct current source 52 may be removed from the superconducting solenoid 62 and the superconducting solenoid 62 may be short circuited at its input by closing switch 66 and opening switch 56. A circulating current through the superconducting solenoid 62 will continue as long as the superconducting solenoid 62 is kept below the transition temperature of the core material. By transition temperature it will be understood that I mean the temperature at which a material will become superconducting. For example, the transition temperature of Niobium is 8° Kelvin. Other elements, alloys and compounds become superconductive at temperatures ranging between 0° and 17° Kelvin. The polarity of the direct current applied to the superconducting solenoid 62 and the direction of the windings are so chosen that the current in the superconducting solenoid 62 produces a magnetic field which is additive to the magnetic field of the starting coil 46. The superconducting solenoid 62 is designed to produce a magnetic field much stronger than the magnetic field produced by the starting coil 46. Once the superconducting solenoid 62 produces its own magnetic field the superconducting solenoid 62 becomes essentially self-quenching as to the sheathing of the composite conductor. The sheathing on the superconducting solenoid 62 will remain normal or resistive as long as the solenoid 62 is producing a magnetic field equal to or greater than the critical field of the sheathing material. The magnetic field produced by the superconducting solenoid 62 is more than strong enough to keep the sheathing of the composite conductor superconducting wires from becoming superconducting. The starting coil 46 is no longer required and may now be deenergized by opening switch 58. If a plurality of composite conductor superconducting solenoids are used in a given application, the starting coil 46 may now be moved into position to start a second superconducting solenoid into operation by effectively insulating the superconducting core of the composite conductor of the second superconducting solenoid.

Figure 6:
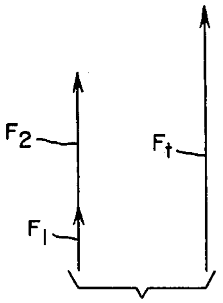
FIG. 6 shows vector diagrams of the magnetic fluxes produced by the invention.

At FIG. 6 of the drawings one may see vector diagrams of the magnetic flux produced by the two solenoids of the invention. $F_1$ is the flux produced by the starting coil, $F_2$ is the flux produced by the composite conductor superconducting solenoid. It will be noted that flux $F_1$ and flux $F_2$ are additive and that the magnitude of flux $F_2$ is greater than the magnitude of $F_1$. $F_t$ is the total flux produced by the composite conductor superconducting solenoid and the starting coil when both are in operation.

It will, therefore, be apparent that there has been disclosed an invention which permits the use of composite conductors in superconducting solenoids when both the core and the sheathing of the composite conductor are each capable of being made superconducting. Conventional electrical insulation is not required between turns of the solenoid.

Since numerous changes may be made in the above-described apparatus and different embodiments may be made without parting from the spirit thereof, it is intended that all the matter contained in the foregoing description or shown in the accompanying drawing shall be interpreted as illustrative and not in a limiting sense.

I claim as my invention:

1. In combination for use in an electromagnet: a coil of composite wire, said composite wire having a core of a first material which may be made superconducting, a sheath of a second material which may be made superconducting surrounding said core, the critical magnetic field of said second material being lower than the critical magnetic field of said first material, cooling means to render said coil superconducting, magnetic field means disposed to render said sheath non-superconducting, means for initiating an electrical current in said coil, said means for initiating an electrical current in said coil being independently controllable with respect to said magnetic field means, to allow said magnetic field means to render said sheath non-superconducting before an electric current is initiated in said coil.

2. An improved electrically superconducting electromagnet comprising a solenoid wound of composite conductors, said composite conductors having a central core of a first material which may be made electrically superconducting, said central core surrounded by a sheath of a second material which may be made electrically superconducting, the critical magnetic field of said second material being less than the critical magnetic field of said first material, cooling means to render the solenoid electrically superconducting, magnetic field means external to said solenoid to render the sheath of the composite wire resistive, means for initiating an electric current in said solenoid, said magnetic field means and said means for initiating an electric current in said solenoid being independently controllable, to allow said magnetic field means to render said sheath non-superconducting before the electric current is initiated in said solenoid.

3. An improved superconducting solenoid comprising a coil having a plurality of turns of composite wire, said composite wire having an inner conductor of a first material capable of being made electrically superconducting below a transition temperature, and an outer coating of a second material capable of being made superconducting below a transition temperature, said outer coating being made of a material which has a lower critical magnetic field than the critical magnetic field of said inner conductor, means for maintaining said solenoid below the transition temperatures of said first and second materials, magnetic field means which has a magnetic field strength above the critical magnetic field of said second material for rendering the outer coating resistive, but below the critical magnetic field of said first material, and means for initiating current flow in said solenoid, said magnetic field means and said means for initiating current flow in said solenoid being independently controllable to allow said magnetic field means to render the outer coating resistive before current is initiated in said solenoid.

4. An improved electrically superconducting coil, said electrically superconducting coil comprising a plurality of turns of at least one composite conductor, said composite conductor having a central core of a first material capable of being made electrically superconducting, said central core overlayed with a sheath of a second material capable of being made electrically superconducting, said second material having a lower critical magnetic field than said first material, cooling means for rendering the coil electrically superconducting, magnetic field means for rendering the sheath of said composite conductor more electrically resistive than the central core of said conductor, to effectively insulate the plurality of turns from one another, and means for initiating an electrical current in said coil, said magnetic field means and said means for initiating an electrical current in said coil being independently controllable to allow said sheath to electrically insulate said plurality of turns before an electrical current is initiated in said coil.

5. In combination for use as an electromagnet, a first coil comprising a plurality of turns of a composite wire, said composite wire comprising a central core of a first material capable of being made electrically superconducting, said central core coated with a sheath of a second material capable of being made electrically superconducting, said second material having a lower critical magnetic field than said first material, a second coil comprising a plurality of turns of an electrical conductor, said second coil being disposed adjacent said first coil, cooling means to cause the first coil to become electrically superconducting, means to energize said second coil from a source of direct current to produce a magnetic field of sufficient strength to cause the sheath of said composite wire to be rendered electrically non-superconducting, and means to energize said first coil from a source of direct current so that the magnetic field produced by said first coil is additive to the magnetic field produced by said second coil.

6. In combination for use as an electromagnet, a first solenoid comprising a plurality of turns of a composite wire, said composite wire comprising a central core of a first material capable of being made superconducting, said central core coated with a second material capable of being made superconducting, said second material having a lower critical magnetic field than said first material, a second solenoid comprising a plurality of turns of a material capable of being made superconducting, said second solenoid being disposed in inductive relation with said first solenoid, cooling means to cause said first and second solenoids to become superconducting, means to create a first magnetic field by connecting said second solenoid to a source of direct current, the first magnetic field having a strength at least equal to the critical magnetic field of said second material and less than the critical magnetic field of said first material to render the sheath of the composite wire of said first solenoid non-superconducting, and means to create a second magnetic field by connecting said first solenoid to a source of direct current of such a polarity that the second magnetic field is additive to the first magnetic field, said means for creating said first magnetic field being controllable independent of said means for creating the second magnetic field, to allow said first magnetic field to be created before said second magnetic field is created.

7. In combination for use as an electromagnet, a solenoid comprising a plurality of turns of a composite conductor, said composite conductor comprising a central core of a first material capable of being made superconducting, said central core sheathed with a second material capable of being made superconducting, said second material having a critical magnetic field substantially lower than the critical magnetic field of the first material, cooling means to render the composite conductor solenoid superconducting, magnetic field means to electrically insulate the plurality of turns from one another by subjecting the composite conductor to a magnetic field at least equal to the critical magnetic field of the sheathing material, and means to initiate a circulating current in the composite conductor solenoid, said magnetic field means and said means for initiating the current in said solenoid being independently controllable to allow the plurality of turns to be electrically insulated before the current in said solenoid is initiated.

References Cited by the Examiner

UNITED STATES PATENTS

| | | |
|---|---|---|
| 3,124,455 | 3/64 | Buehler et al. |
| 3,129,359 | 4/64 | Kunzler. |
| 3,150,291 | 9/64 | Laquer. |
| 3,156,850 | 11/64 | Walters. |

BERNARD A. GILHEANY, *Primary Examiner.*

LARAMIE E. ASKIN, *Examiner.*